(12) United States Patent
Khakhalev et al.

(10) Patent No.: US 8,841,017 B2
(45) Date of Patent: Sep. 23, 2014

(54) CELL TAB AND INTERCONNECT ASSEMBLY FOR A BATTERY PACK

(75) Inventors: Alexander D. Khakhalev, Troy, MI (US); Leo Canale, Brooklin (CA)

(73) Assignee: GM Global Technology Operations LLC, Detroit, MI (US)

( * ) Notice: Subject to any disclaimer, the term of this patent is extended or adjusted under 35 U.S.C. 154(b) by 966 days.

(21) Appl. No.: 12/508,983

(22) Filed: Jul. 24, 2009

(65) Prior Publication Data

US 2011/0020690 A1    Jan. 27, 2011

(51) Int. Cl.
*H01M 2/22* (2006.01)

(52) U.S. Cl.
CPC . *H01M 2/22* (2013.01); *Y02E 60/12* (2013.01)
USPC ............ 429/121; 429/160; 429/211

(58) Field of Classification Search
CPC ............ H01M 2/202; H01M 2/206; H01M 2/22–2/28; H01M 2/30; H01M 2/305; Y02E 60/12
USPC ................... 429/121, 123, 160, 211
See application file for complete search history.

(56) References Cited

U.S. PATENT DOCUMENTS

| | | | | |
|---|---|---|---|---|
| 6,146,778 A | * | 11/2000 | Rouillard et al. | 429/7 |
| 6,156,452 A | * | 12/2000 | Kozuki et al. | 429/211 |
| 2006/0177734 A1 | * | 8/2006 | Yao | 429/160 |
| 2007/0134551 A1 | * | 6/2007 | Cyr et al. | 429/160 |
| 2009/0297892 A1 | * | 12/2009 | Ijaz et al. | 429/7 |
| 2010/0190055 A1 | * | 7/2010 | Khakhalev | 429/211 |

* cited by examiner

*Primary Examiner* — Raymond Alejandro
*Assistant Examiner* — Helen McDermott

(57) ABSTRACT

A battery pack for a vehicle has battery cells with foil cell tabs that are welded to an interconnect. Nickel plated copper is bonded to aluminum for either a first set of the battery cells, a second set of the battery cells or for the interconnect. Similar materials are then adjacent to each other at the weld locations between the foil cell tabs and the interconnect to avoid welding of dissimilar metals.

5 Claims, 3 Drawing Sheets

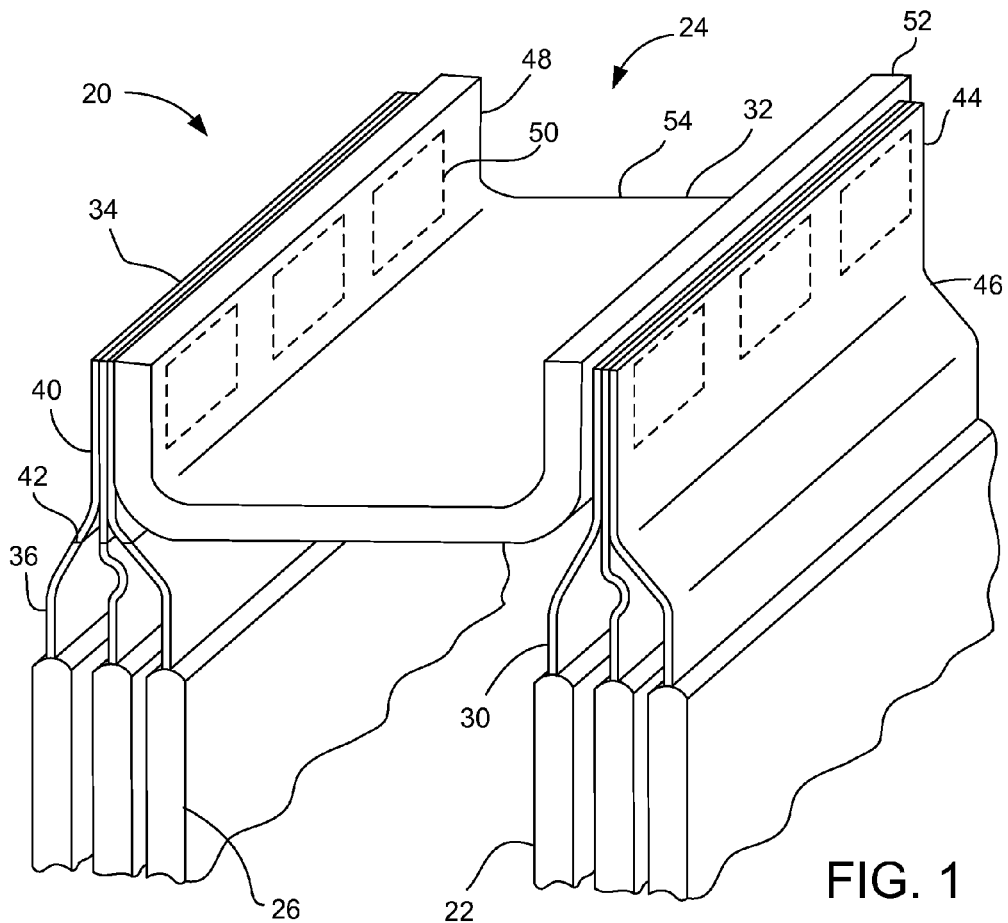
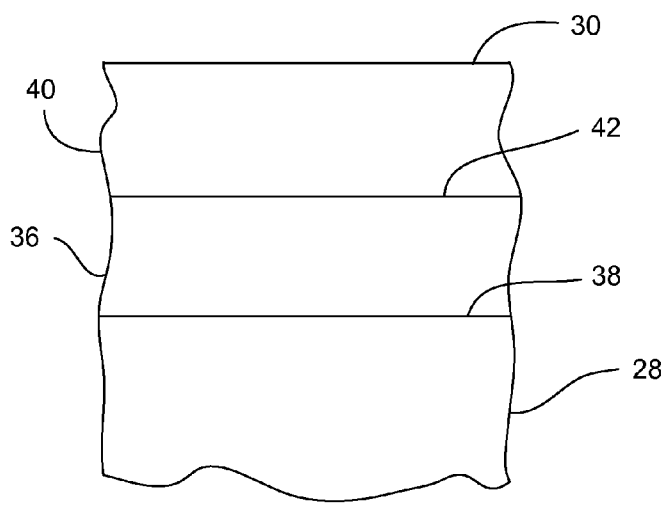
FIG. 1
FIG. 2

CELL TAB AND INTERCONNECT ASSEMBLY FOR A BATTERY PACK

BACKGROUND OF INVENTION

The present invention relates generally to welding of components in a vehicle battery pack.

Increasing numbers of automotive vehicles are being produced that require the use of relatively large battery packs, such as, for example, hybrid electric, plug-in hybrid electric, battery electric, and fuel cell vehicles. The battery packs in these vehicles may require a large number of welds to attach various components together. It is desirable, then, to assemble the battery packs with components and welds that are cost effective, reliable, durable and resist degradation from the environment in which these vehicle battery packs operate. The environment may include, for example, vibrations, a significant range of operating temperatures, and moisture from condensation of water vapor.

SUMMARY OF INVENTION

An embodiment contemplates a battery pack for use in a vehicle that may comprise first and second sets of battery cells, an interconnect and welds. Each of the battery cells in the first set may include a first main body and a first foil cell tab extending from the first main body, with each of the first foil cell tabs including a nickel plated copper base portion extending from the respective first main body and an aluminum contact portion bonded to and extending from the respective base portion. Each of the battery cells in the second set may include a second main body and a second foil cell tab extending from the second main body, with each of the second foil cell tabs being made of aluminum. The interconnect may be made of aluminum and have a bridge, a first leg extending from the bridge and a second leg spaced from the first leg and extending from the bridge. A first set of welds secures the contact portions of the first foil cell tabs to the first leg and a second set of welds secures the foil cell tabs of the second set of battery cells to the second leg.

An embodiment contemplates a battery pack for use in a vehicle comprising: a first set of battery cells, each of the battery cells in the first set including a first main body and a first foil cell tab extending from the first main body, each of the first foil cell tabs being made of a nickel plated copper; a second set of battery cells, each of the battery cells in the second set including a second main body and a second foil cell tab extending from the second main body, each of the second foil cell tabs including an aluminum base portion extending from the respective first main body and a nickel plated copper contact portion bonded to and extending from the respective base portion; a nickel plated copper interconnect having a bridge, a first leg extending from the bridge and a second leg spaced from the first leg and extending from the bridge; and a first set of welds securing the first foil cell tabs to the first leg and a second set of welds securing the contact portions of the foil cell tabs of the second set of battery cells to the second leg.

An embodiment contemplates a battery pack for use in a vehicle comprising: a first set of battery cells, each of the battery cells in the first set including a first main body and a first foil cell tab extending from the first main body, each of the first foil cell tabs being made of a nickel plated copper; a second set of battery cells, each of the battery cells in the second set including a second main body and a second foil cell tab extending from the second main body, each of the second foil cell tabs being made of aluminum; an interconnect having a bridge, a first leg extending from the bridge and a second leg spaced from the first leg and extending from the bridge, the first leg and an adjacent portion of the bridge being made of nickel plated copper and the second leg and an adjacent portion of the bridge being made of aluminum, the nickel plated copper portion of the bridge being bonded to the aluminum portion of the bridge; and a first set of welds securing the first foil cell tabs to the first leg and a second set of welds securing the second foil cell tabs to the second leg.

An advantage of an embodiment is that the welding process for welding foil cell tabs to interconnects is simplified since similar metals are being welded thus requiring only one set of weld parameters. This welding of similar metals may improve overall weld quality for the weld joints in the cell tab and interconnect assembly in the battery pack. Also, with similar metals being welded together, rather than different metals, the risk of having electrolytic corrosion is eliminated. And, having similar metals welded together, the coefficient of thermal expansion at the weld joints will be the same on both sides of the joint.

BRIEF DESCRIPTION OF DRAWINGS

FIG. 1 is a schematic, perspective view of a cell tab and interconnect assembly.

FIG. 2 is a schematic, elevation view of a portion of a battery cell.

DETAILED DESCRIPTION

Figure 3:
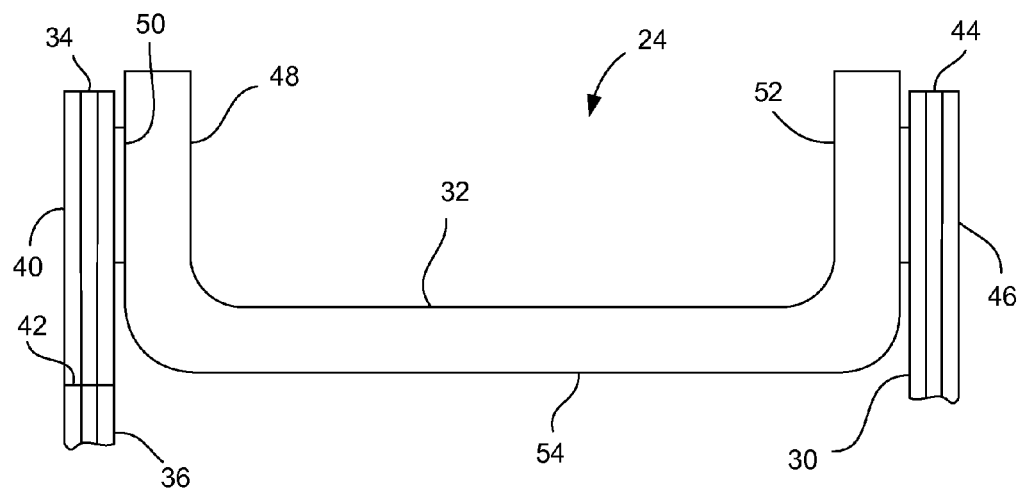
FIG. 3 is a schematic, side elevation view of a portion of a cell tab and interconnect assembly.

FIGS. 1-3 illustrate a portion of a battery pack 20 for use in a vehicle (not shown). The battery pack 20 includes many battery cells 22, six of which are shown in FIG. 1. The various sets of battery cells 22 are connected together using cell tab and interconnect assemblies 24, which are welded together. For example, a single plug-in hybrid electric vehicle may include dozens of the battery cells 22, so this vehicle may have hundreds of weld locations on the cell tab and interconnect assemblies 24.

Each battery cell 22 includes a main body 26 (shown in FIG. 1), within which is located an active material 28 (shown in FIG. 2). Bonded to the active material 28 of each battery cell 22 is a foil cell tab 30. The foil cell tabs 30 are formed of different materials depending upon which side of an aluminum, for example, interconnect 32 the foil cell tabs 30 are located. Each of the foil cell tabs 30 in a first set 34 (shown on the left side in FIGS. 1 and 3 and shown in FIG. 2) have a base portion 36 that is formed of a nickel plated copper and bonded (along a bond line 38) to the active material 28 that forms part of a negative plate. Each of the foil cell tabs 30 in the first set 34 also includes a contact portion 40 that is made of aluminum and bonded (along a bond line 42) to its respective base portion 36. Each of the foil cell tabs 30 in a second set 44 (shown on the right side in FIGS. 1 and 3) have a combined base and contact portion 46 that is made of aluminum and bonded to a plate active material/cell electrodes (not shown) located in the battery cells 22.

Each cell tab and interconnect assembly 24 includes the interconnect 32 and the particular foil cell tabs 30 welded to it. The interconnect 32 includes a first leg 48 connected to the first set 34 of foil cell tabs 30 via welds 50, a second leg 52 connected to the second set 44 of foil cell tabs 30 via welds 50, and a bridge 54 connecting the first leg 48 to the second leg 52. The welds 50 are preferably formed by ultrasonic, resistance or laser welding the foil cell tabs 30 to the interconnect 32. One will note that each of the welds 50 in the cell tab and interconnect assembly 24 welds aluminum to aluminum, thus avoiding welding of dissimilar metals and the risks associated with joints where dissimilar metals are welded together.

Figure 4:
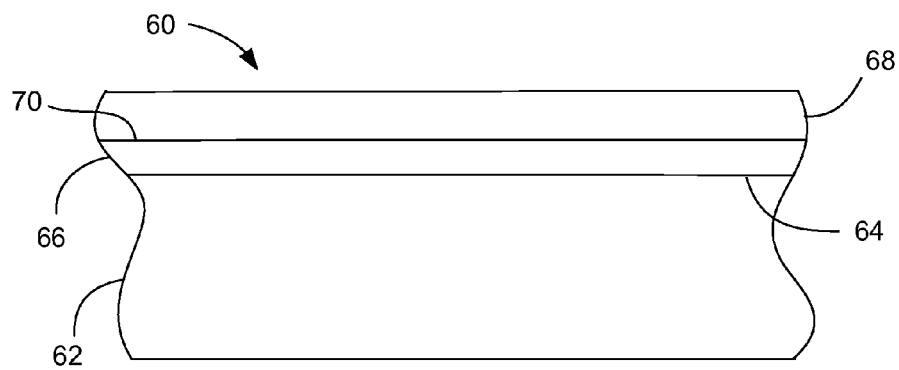
FIG. 4 is a schematic, elevation view of a portion of a strip from a roll of material.
Figure 5:
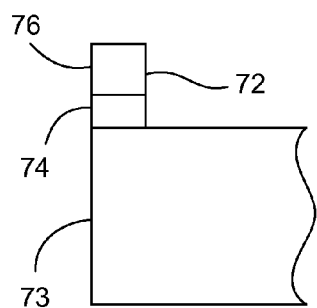
FIG. 5 is a schematic, elevation view of a portion of a battery cell formed from the strip of material shown in FIG. 4.

FIGS. 4 and 5 show how a portion of the first embodiment is created. In FIG. 4, a strip of material 60 from a roll includes a strip of negative plate active material 62 that is bonded (along a bond line 64) to a strip of nickel plated copper material 66, and a strip of aluminum 68 that is bonded (along bond line 70) to the strip of nickel plated copper material 66. The bonding may occur during the process of making the material 60, prior to rolling the material for shipment. In FIG. 5, a portion of a battery cell is shown after it is cut from the strip of material 60. After cutting, the foil cell tab 72 extending upward from the negative plate active material 73 has a nickel plated copper base portion 74 and an aluminum contact portion 76.

Figure 6:
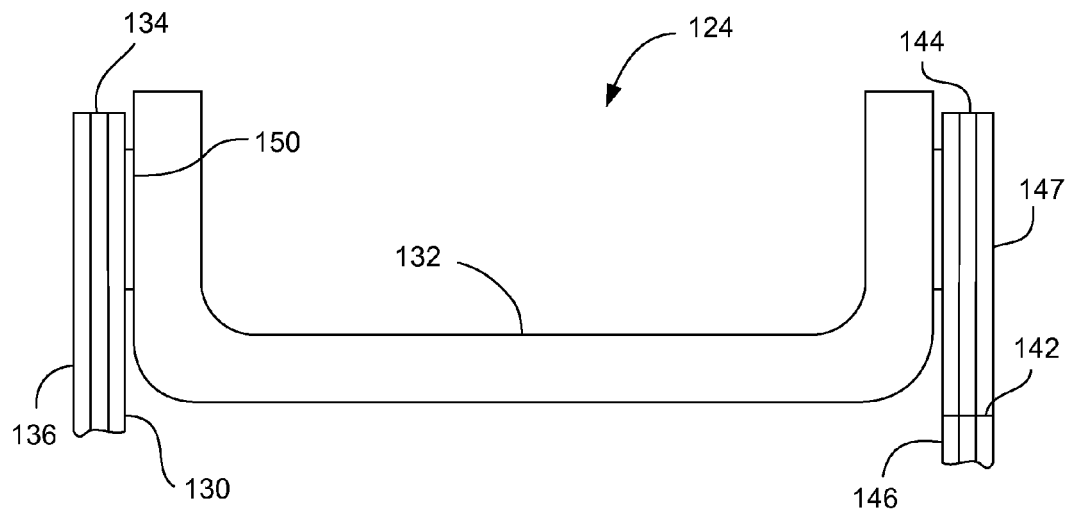
FIG. 6 is a view similar to FIG. 3, but illustrating a second embodiment.

FIG. 6 illustrates a second embodiment of the cell tab and interconnect assembly 124. In this embodiment, similar elements are similarly designated with the first embodiment but falling with the 100-series. The interconnect 132 is made of nickel plated copper and the first set 134 of foil cell tabs 130 have a combined base and contact portion 136 that is made of nickel plated copper. Thus, the welds 150 are between similar material. For the second set 144 of foil cell tabs 130, a base portion 146 is still made of aluminum, but a nickel plated copper contact portion 147 is now bonded to the base portion 146 (along a bond line 142). Again, the welding is between similar materials.

Figure 7:
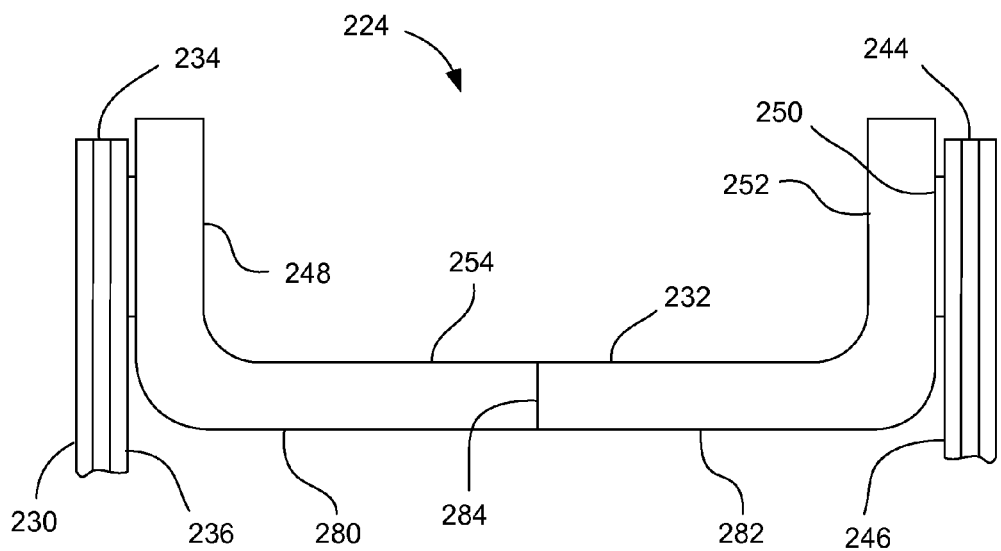
FIG. 7 is a view similar to FIG. 3, but illustrating a third embodiment.

FIG. 7 illustrates a third embodiment of the cell tab and interconnect assembly 224. In this embodiment, similar elements are similarly designated with the first embodiment, but falling within the 200-series. The interconnect 232 now includes a nickel plated copper portion 280 and an aluminum portion 282 that are boned together along a bond line 284. Thus, the first leg 248 is made of nickel plated copper and the second leg 252 is made of aluminum, with part of the bridge 254 being made of nickel plated copper and another part being made of aluminum. The first set 234 of foil cell tabs 230 have a combined base and contact portion 236 that is made of nickel plated copper and the second set 244 of foil cell tabs 230 have a combined base and contact portion 246 that is made of aluminum. Once again, the welds 250 are between parts made of similar materials.

While certain embodiments of the present invention have been described in detail, those familiar with the art to which this invention relates will recognize various alternative designs and embodiments for practicing the invention as defined by the following claims.

What is claimed is:

1. A battery pack for use in a vehicle comprising:
  a first set of battery cells, each of the battery cells in the first set including a first main body and a first foil cell tab extending from the first main body, each of the first foil cell tabs including a nickel plated copper base portion extending from the respective first main body and an aluminum contact portion bonded to and extending from the respective base portion;
  a second set of battery cells, each of the battery cells in the second set including a second main body and a second foil cell tab extending from the second main body, each of the second foil cell tabs being made of aluminum;
  an aluminum interconnect having a bridge, a first leg extending from the bridge and a second leg spaced from the first leg and extending from the bridge; and
  a first set of welds securing the contact portions of the first foil cell tabs to the first leg and a second set of welds securing the foil cell tabs of the second set of battery cells to the second leg.

2. The battery pack of claim 1 wherein the first set of welds and the second set of welds are ultrasonic welds.

3. The battery pack of claim 1 wherein the base portion of each of the first foil cell tabs is bonded to a negative plate active material, the negative plate active material being a part of the main body of each of the first set of battery cells.

4. A battery pack for use in a vehicle comprising:
  a first set of battery cells, each of the battery cells in the first set including a first main body and a first foil cell tab extending from the first main body, each of the first foil cell tabs being made of a nickel plated copper;
  a second set of battery cells, each of the battery cells in the second set including a second main body and a second foil cell tab extending from the second main body, each of the second foil cell tabs including an aluminum base portion extending from the respective first main body and a nickel plated copper contact portion bonded to and extending from the respective base portion;
  a nickel plated copper interconnect having a bridge, a first leg extending from the bridge and a second leg spaced from the first leg and extending from the bridge; and
  a first set of welds securing the first foil cell tabs to the first leg and a second set of welds securing the contact portions of the foil cell tabs of the second set of battery cells to the second leg.

5. The battery pack of claim 4 wherein the first set of welds and the second set of welds are ultrasonic welds.

* * * * *